United States Patent [19]

Rossnan

[11] 3,751,844
[45] Aug. 14, 1973

[54] FISHING HOOK
[76] Inventor: Michael Rossnan, 11724 Lovejoy St., Silver Spring, Md.
[22] Filed: Apr. 13, 1971
[21] Appl. No.: 133,563

[52] U.S. Cl. .................................................. 43/36
[51] Int. Cl. ............................................ A01k 83/02
[58] Field of Search ..................... 43/36, 34, 35, 37

[56] References Cited
UNITED STATES PATENTS
3,205,607  9/1965  Rossnan ............................. 43/36

Primary Examiner—Antonio F. Guida
Assistant Examiner—Daniel J. Leach

[57] ABSTRACT

A fish hook comprising a main hook and at least one oscillatable hook mounted in journals secured to the main hook for rotative movement relative to the main hook. A tensioned coil spring is secured to the shank of the oscillatable hook to bias it away from the main hook. A trigger member secured to the main hook has a looped end engaging the hook bight portions and is released therefrom by the bite of a fish to cause the oscillatable hook to spring outwardly.

2 Claims, 7 Drawing Figures

PATENTED AUG 14 1973 3,751,844
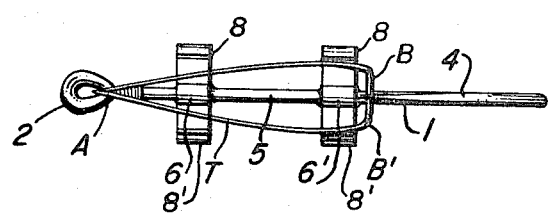
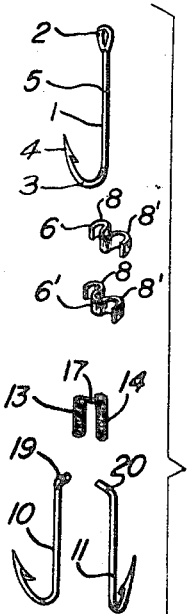
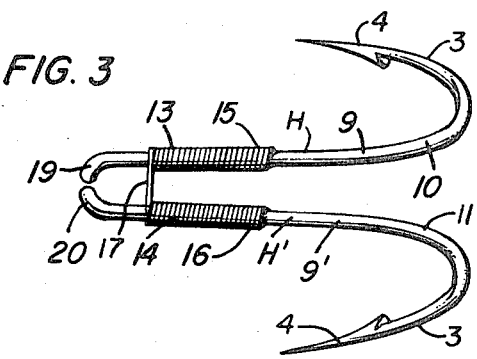
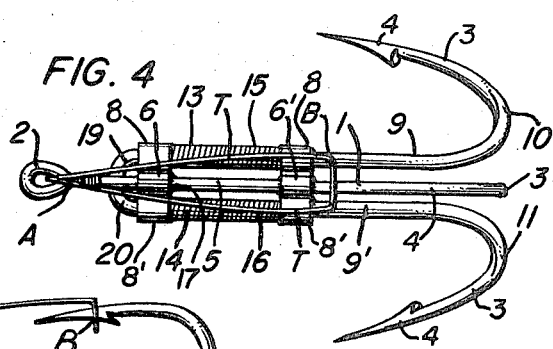
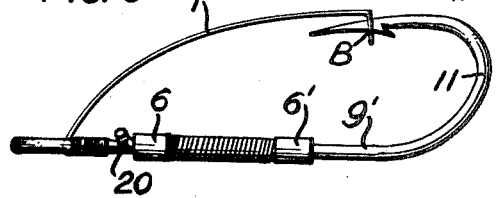
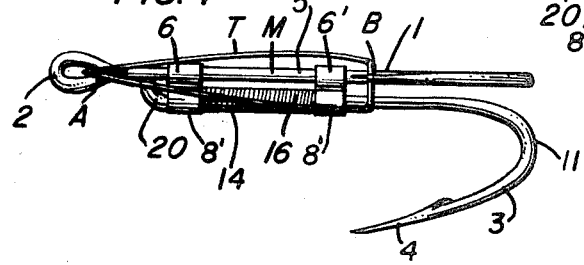
INVENTOR
Michael Rossnan

FISHING HOOK

The present invention relates to improvements in FISHING HOOK, and more particularly to a plural bight and barb hook, in which a main carrying hook supports and carries one or two spring actuated oscillatory hooks.

This particular assembly is one outcome of the fishing hook set forth in Reissued U.S. Pat. No. Re 26,198, dated Apr. 25, 1967.

In order that the assembled hook may be fully understood and appreciated, attention is invited to the accompanying drawings, in which:

FIG. 1 is a view showing the unassembled hook.

FIG. 2 is a plan view of the main carrying hook with two journaling plates and trigger attached.

FIG. 3 is a plan view of the two oscillatable hooks with their operating springs assembled thereon.

FIG. 4 is a front view of the completely assembled hook with the two oscillatable hooks in spread position.

FIG. 5 is a similar view with the hooks held in fishing position by the trigger.

FIG. 6 is a side view with the hook held in fishing position by the trigger.

FIG. 7 is a view similar to FIG. 4 of a single oscillatory fishing hook.

Referring to FIGS. 2 to 6 of the drawings, the numeral 1 designates the main carrying hook, having a line attaching eye 2 at one end, and a bight 3 and barb 4 at the other end, as is usual with fishing hooks. However, that this hook may carry the two oscillatable hooks H and H', there is connected to the shank 5 of the main hook, two metal journal forming plates 6 and 6', each one of which is attached by soldering or welding as shown in FIG. 2. The seats 8 and 8 being malleable are formed into journals to receive the respective shanks 9 and 9' of the oscillatable hooks 10 and 11, which have threaded thereon the coil springs 13 and 14 having ends 15 and 16 soldered or welded to the shanks of the oscillatable hooks and connected at their other ends by the bridging and attaching central straight section 17. The springs 13 and 14 are locked in their respective journals carried upon the shank of the main hook, and each has an opposite tension from the other so that they can be held open and away from the bight and barb of the main hook, with the connecting member 17 of the two springs unattached to the main hook, but frictionally held thereagainst without soldering, which may, if necessary, be resorted to.

The bent ends 19 and 20 of the oscillatory hooks act to limit the longitudinal movement of the oscillatable hooks and they also limit the spread of the bights and barbs of such hook when being released after a fish has struck and the bights and barbs of the spring-controlled hooks are free, either from a bait that holds the hooks in fishing position, or by the trigger T, made from a single strand of wire with its terminals A attached to the main hook near its line attaching eye, and with the right-angled barb engaging terminal B.

From the foregoing description taken with the drawings, it will be seen that the hooks composed of one main carrying hook and two oscillatable hooks presents a novel and practical device for all types of fishing, as it is, or with spoons and lures when desired, and to more simplify this hook, the hook as shown in FIG. 7, which in all details is similar to the three membered hooks, may have only the main carrying hook M, and a single oscillatable hook H, the similar parts being designated by primed numerals.

From the foregoing description, it is evident that there is produced a practical fishing hook that is usable with a bait, a trigger, and also with various types of spoons and lures. The trigger also when engaged to the bight of all hooks acts as a weedless guard, that keeps the barbs from engaging weeds or debris.

What is claimed as new is:

1. A fishing hook composed of a main carrying hook, having a shank, a line attaching means at one end, and a bight and barb at the other end, two journals attached to the shank thereof in spaced relation, at least one oscillatable hook having a shank mounted in said journals, a tensioned coil spring formed from a single strand of wire carried upon the shank of the oscillatable hook and exerting tension thereon to rotatably move and hold the bight and barb portion away from the bight and barb portion of the main hook, the said oscillatable hook having a bent terminal that limits the rotative movement thereof and holds it from longitudinal movement in said journals, and a trigger member made from a doubled strand of wire having terminals attached to the main hook adjacent to the line attaching eye, and a looped end disposed to engage the bight portions of the main and oscillatable hooks.

2. A fishing hook as claimed in claim 1, wherein two oscillatable hooks are mounted in the journals, the tensioned spring formed into a pair of two oppositely tensioned coils secured to the shanks of the oscillatable hooks.

* * * * *